United States Patent
Davis et al.

(10) Patent No.: US 8,046,461 B2
(45) Date of Patent: Oct. 25, 2011

(54) METHODS, SYSTEMS AND PROGRAM PRODUCTS FOR DELIVERY OF WEB SERVICES USING CATEGORICAL CONTRACTS

(75) Inventors: Douglas B. Davis, Raleigh, NC (US); Yih-Shin Tan, Raleigh, NC (US); Vivekanand Vellanki, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2869 days.

(21) Appl. No.: 10/608,268

(22) Filed: Jun. 27, 2003

(65) Prior Publication Data
US 2004/0267927 A1 Dec. 30, 2004

(51) Int. Cl.
G06F 15/173 (2006.01)
(52) U.S. Cl. .................................. 709/226; 709/223
(58) Field of Classification Search .................. 709/246, 709/217, 229, 223–226, 201–203, 238–239, 709/245
See application file for complete search history.

(56) References Cited

U.S. PATENT DOCUMENTS

| | | | | |
|---|---|---|---|---|
| 6,434,619 | B1* | 8/2002 | Lim et al. | 709/229 |
| 2003/0004746 | A1 | 1/2003 | Kheirolomoom et al. | 705/1 |
| 2003/0061404 | A1* | 3/2003 | Atwal et al. | 709/328 |
| 2003/0204645 | A1* | 10/2003 | Sharma et al. | 709/328 |
| 2004/0010786 | A1* | 1/2004 | Cool et al. | 717/170 |
| 2004/0122892 | A1* | 6/2004 | Brittenham et al. | 709/203 |
| 2005/0015491 | A1* | 1/2005 | Koeppel | 709/226 |
| 2005/0198188 | A1* | 9/2005 | Hickman | 709/217 |

OTHER PUBLICATIONS

"Talking Blocks/Platform and Technology," http://www.talkingblocks.com/products_platform.htm, printed Apr. 1, 2003, 3 pages.
"Migrating Toward Web Services," http://www.acmqueue.org/issue/promises2.cfm?client_no=NEW, printed Apr. 2, 2003, 2 pages.
"Versata Logic Server: Web Services & XML Add-On," http://www.versata.com/products/inSuite/webservicesandxml.add-on.html, printed Apr. 2, 2003.
Andrade, Luis Filipe, "Trust: Components vs Services," ATX Software S.A., Department of Mathematics and Computer Science, University of Leicester, Leicester LE1 7QP, UK, 5 pages.

* cited by examiner

Primary Examiner — Brendan Higa
(74) Attorney, Agent, or Firm — Jeanine S. Ray-Yarletts

(57) ABSTRACT

Web services may be provided by creating an electronic record of a contract for a service provider to provide web services meeting a web service category definition at a web services hub of a service domain, and providing a web service to a service requestor from the service domain responsive to the electronic record of the contract. A plurality of ports operative to provide web services meeting the service category definition may be identified at the web service hub, and the web service may be provided to the service requester responsive to identification of the ports. For example, a plurality of ports may be identified by polling at least one web services node subordinate to the web services hub to identify at least one service provided by the node, and updating a description of a service category, e.g., a WSDL document, responsive to the polling. A plurality of levels of web services nodes may be polled using a coordinated polling interval scheme to create an updated service view for the service hub.

1 Claim, 4 Drawing Sheets

METHODS, SYSTEMS AND PROGRAM PRODUCTS FOR DELIVERY OF WEB SERVICES USING CATEGORICAL CONTRACTS

BACKGROUND OF THE INVENTION

The present invention relates to distributed computing systems, methods and computer program products, and more particularly, to systems, methods and computer program products for providing web services.

Web services are self-contained, self-describing, modular applications that can be published, located, and invoked across the Web. Web services perform functions that can be anything from simple requests to complicated business processes. Once a web service is deployed, other applications (and other web services) can discover and invoke the deployed service.

Web services may be informational or transactional, i.e., some services provide information of interest to the requestor while other services may actually lead to the invocation of business processes. Examples of publicly available web services today include stock quote services, services to retrieve news from web news sources, and currency conversion services.

Web services are typically deployed on the web by service providers. Service brokers may act as clearinghouses for services. Service brokers may act as matchmakers between service providers and service requestors, by helping service providers and service requesters find each other. Typically, a service requester uses an application programming interface (API) to ask the service broker about the services it needs. When the service broker returns results, the service requestor can use those results to bind to a particular service.

There are three common web services operations. Publishing and unpublishing involve advertising services to a registry (publishing) or removing those entries (unpublishing). The service provider contacts the service broker to publish or unpublish a service. A find operation is performed by service requestors and service brokers together. The service requestors describe the kinds of services they're looking for, and the service brokers deliver results that best match the request. A bind operation takes place between the service requester and the service provider. The two parties negotiate as appropriate so the requestor can access and invoke services of the provider.

Web services may be based on the eXtensible Markup Language (XML) standard data format and data exchange mechanisms, which provide both flexibility and platform independence. With web services, requesters typically do not need to know about the underlying implementation of web services, making it easy to integrate heterogeneous business processes.

Often, services are described by WSDL (Web Service Description Language) WSDL documents that are stored at web nodes. A WSDL document may be stored in numerous ways, such as in a file, in a DB2 XML Registry/Repository (such as the DB2 XRR(XML Registry/Repository)), or in a DB2 based UDDI Registry. UDDI (Universal Description, Discovery, Integration) is a protocol for describing web services such that interested parties may easily discover them. Specifications for this registry and use of WSDL in the registry are available currently at www.uddi.org/. Service providers may register their services in a UDDI, specifying technical information about how to invoke the service.

The discovery and organization of services is typically a manual process, i.e., the burden is typically on the service requesters to locate, organize, and manage multiple contractual relationships. FIG. 1 depicts a conventional environment where service requesters SR1, SR2 develop individual usage contracts to consume specific services S1, S2, . . . Sj, and a service Sk through which services Sk1, Sk2, . . . Skm are provided. In such an environment, everything, i.e., the service instances, contracts, and bindings, etc., is specifically identified up front regardless of the scope of services.

A potential limitation of this approach is its static nature, which can reduce the flexibility that is generally desired for e-business application. For example, in such a conventional environment, a new service typically cannot be utilized until it has gone through the full publication process, and requesters have re-subscribed contracts and regenerated their stub codes.

Recently, flexible approaches have been developed based on the concept of a "service grid," wherein multiple instances of similar capability in nature can be grouped as one service representation. Service grid approaches are generally described in a series of articles "Business Service Grid, Part 1: Introduction," "Business Service Grid, Part 2: Implementing a Business Service Grid", and "Business Service Grid, Part 3: Setting Up Rules," published in February and April of 2003 by IBM on the World Wide Web at www.106.ibm.com/developerworks/ibm/library/i-servicegrid/, www.106.ibm.com/developerworks/ibm/library/i-servicegrid2/, and www.106.ibm.com/developerworks/ibm/library/i-servicegrid3/, respectively. U.S. patent application Ser. No. 10/298,962, entitled "System, Method and Program Product for Operating a Grid of Service Providers Based on a Service Policy," filed Nov. 18, 2002, also describes other service domain concepts.

SUMMARY OF THE INVENTION

Embodiments of the present invention can provide a transparent service discovery and self-adjusting contracting process that can relieve a service aggregation e.g.(, a Service Domain) of a need to maintain a central repository for every service instance served up from the aggregation. Requestors may also be relieved from the need to enter specific individual contracts for using particular service instances. In some embodiments of the invention, service providers and requestors enter "soft" contractual relationships that can provide increased service discovery and realignment flexibility. Embodiments of the present invention can include the use contracts with providers that are defined in terms of service categories, adjustable contracts with users that are defined in terms of service levels, automatic service discovery, service information topology arrangement, and a polling mechanism to assemble a current service view for requesters on-demand.

In particular, in some embodiments of the present invention, web services may be provided by creating an electronic record of a contract for a service provider to provide web services meeting a web service category definition at a web services hub of a service domain, and providing a web service to a service requestor from the service domain responsive to the electronic record of the contract. The web service may be provided to the service requester without requiring the service requestor to discover a service instance that provides the service. The web service may also be provided without requiring creation of a contract for the use of a specific service instance.

According to some embodiments of the present invention, providing a web service comprises identifying a plurality of ports operative to provide web services meeting the service category definition at the web service hub, and providing the web service to the service requestor responsive to identification of the ports. For example, a plurality of ports may be identified by polling at least one web services node subordinate to the web services hub to identify at least one service provided by the node, and updating a description of a service category, e.g., a WSDL document, responsive to the polling. In some embodiments, a plurality of levels of web services nodes may be polled using a coordinated polling interval scheme to create an updated service view for the service hub.

In further embodiments of the present invention, an electronic record of a second contract to provide web services that meet a service level criterion to the service requester may be created at the web services hub. A web service may be provided to the service requestor responsive to the electronic records of the first and second contracts. For example, a service request from the service requester may be dispatched in the service domain based on the electronic records of the first and second contracts and a service policy of the web services hub.

The present invention may be embodied as methods, systems (apparatus) and computer program products.

DETAILED DESCRIPTION

Figure 1:
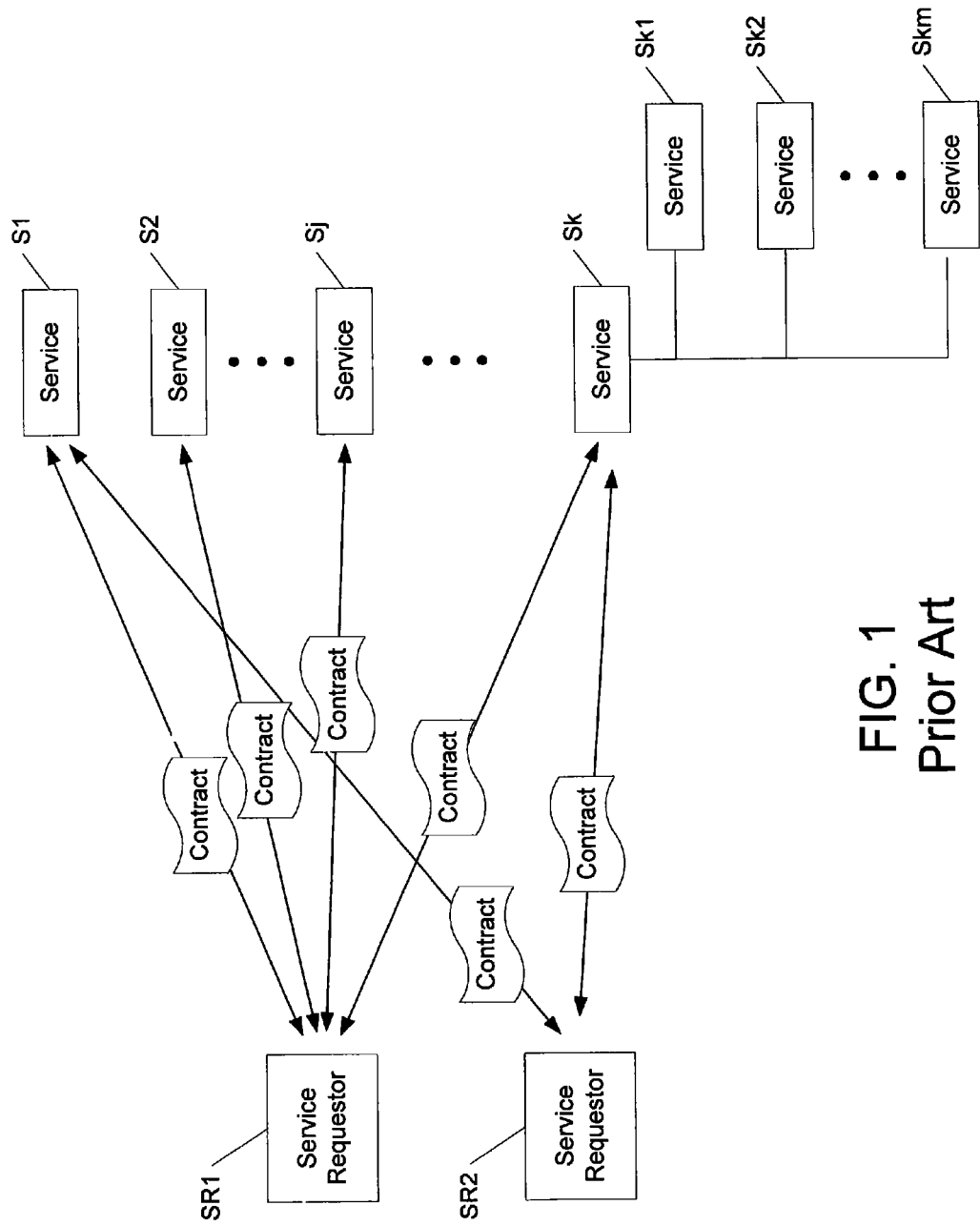
FIG. 1 is a schematic diagram illustrating a conventional web services environment.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present.

The present invention may be embodied as apparatus (systems), methods, and/or articles of manufacture, including computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, computer data signals and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 2:
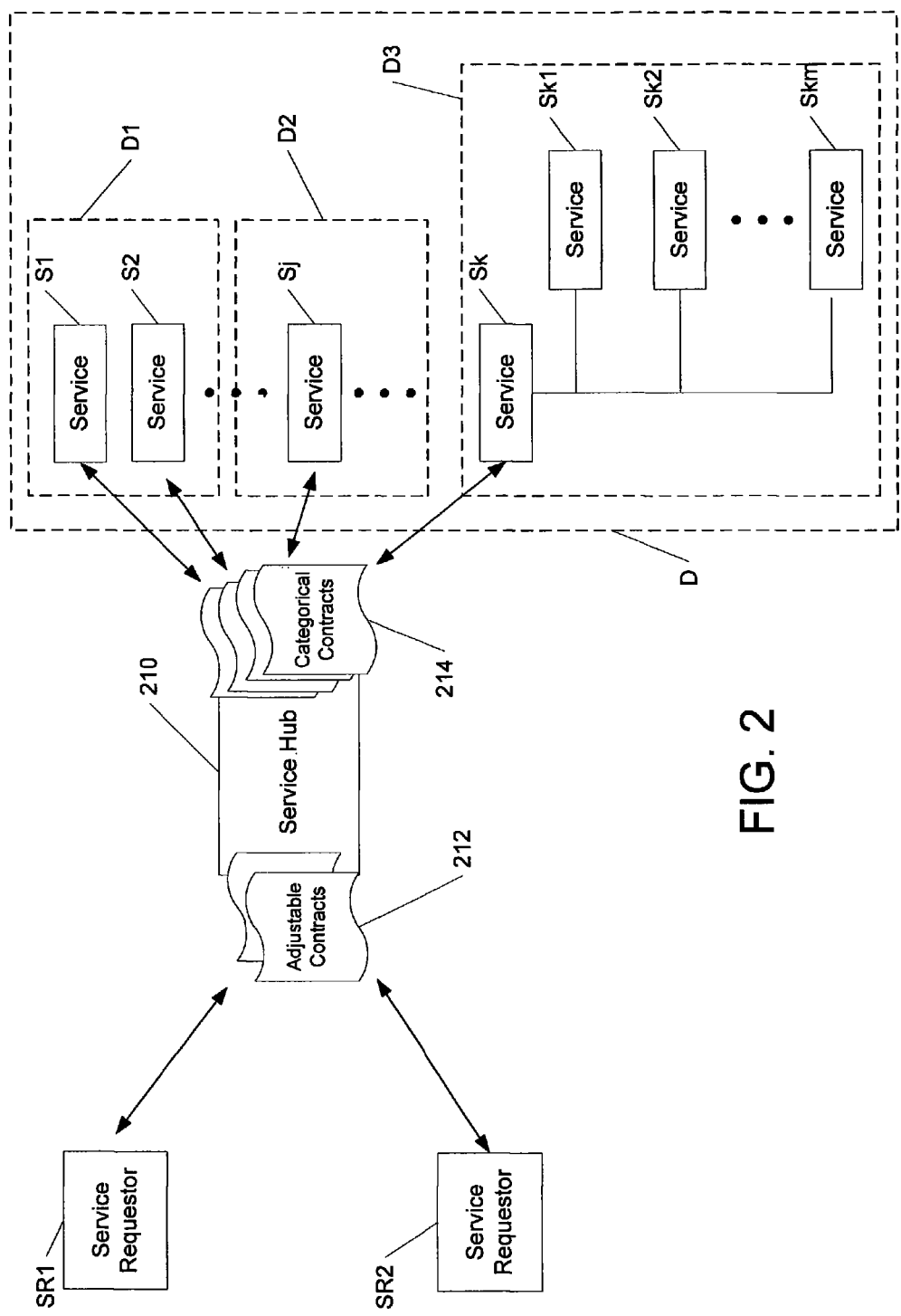
FIG. 2 is a schematic diagram illustrating soft contracting relationships of service providers and service requesters operative via a service hub aggregation site according to some embodiments of the present invention.

FIG. 2 depicts an overview of an exemplary web services environment according to some embodiments of the present invention. Individual service instances S1, S2, . . ., Sj, . . . Sk (in individual domains D1, D2, D3 and a service domain SCx representing an aggregation of service instances SC1, SC2, . . . SCm) are aggregated into a main domain D, and represented at a service hub 210 by a list of aggregated service ports. The service hub 210 maintains adjustable usage contracts 212 that specify a service level to which service requester SR1, SR2 are subscribed. On the service provider side, the service hub 210 maintains categorical contracts 214 for the "supplying" domain D to sign up to categories of service, but not specific services.

In some embodiments of the present invention, the service hub 210 may use a periodic polling mechanism to create an overall service view (e.g., database) of the main domain D based on categorical supplier contracts. Because of the categorical nature of the provider contracts, the service view may change over time, as services are added or deleted. For example, a service requestor that requests a service under a "finance" service category can select a variety of services currently available under that category based on the current service view. There is no need to predefine all the services to the service hub 210 in its own repository, as might be done in the prior art.

Figure 3:
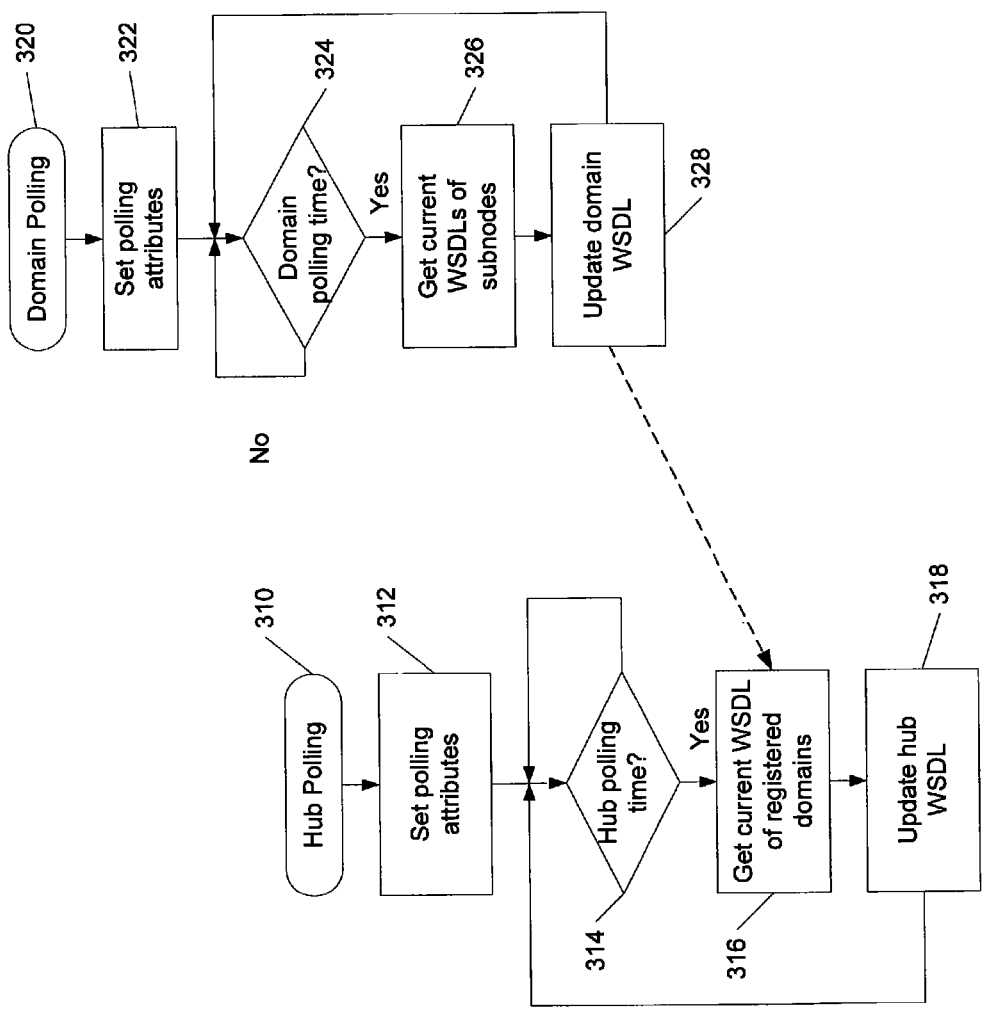
FIG. 3 is a flowchart illustrating exemplary operations for a synchronized service definition polling process according to some embodiments of the present invention.

FIG. 3 illustrates exemplary operations according to some embodiments of the present invention for creating a service view at a service hub using a coordinated polling interval scheme through a domain complex, e.g., using relative polling delays (staggered polling intervals) between levels. In a hub polling loop 310, polling attributes (e.g., a polling interval or other criterion for initiating a polling process) are set (Block 312). When the hub determines that a polling time has arrived (Block 314), it retrieves WSDL descriptions of subordinate nodes of its service domain, which are supplied by subordinate domain polling loops 320 (Block 316). The hub then updates its WSDL description of the service domain (its service view) (Block 318). As shown, in a lower level polling loop 320 for a node subordinate to the service hub, a similar process is carried out, including the setting of polling attributes (Block 320), determination of a polling time (Block 324), retrieval of WSDLs of subnodes (Block 326) and updating of the node's WSDL (Block 328). It will be appreciated that WDSL represents a way to describe service information for the various nodes.

A topological relationship protocol such as levels and scopes could be used to further qualify the aggregation behavior. Therefore, when the service hub polls its member domains, it can automatically find out what ports are available to provide services. Later, when a request is received by the service hub, a recursive dispatching process can automatically pick up the best service instance by going through this topology.

To deal with the dynamic nature of the services to both requestor and service providers, a service hub may use a service view database (or other component) to provide query support. Optionally, a service hub may provide properties files to de-couple a user front-end user interface (UI) application from the service hub application functionality (e.g., polling, discovery, topology navigation, etc.) A UI transformation component could be used to further generate UIs dynamically according to user service levels.

Figure 4:
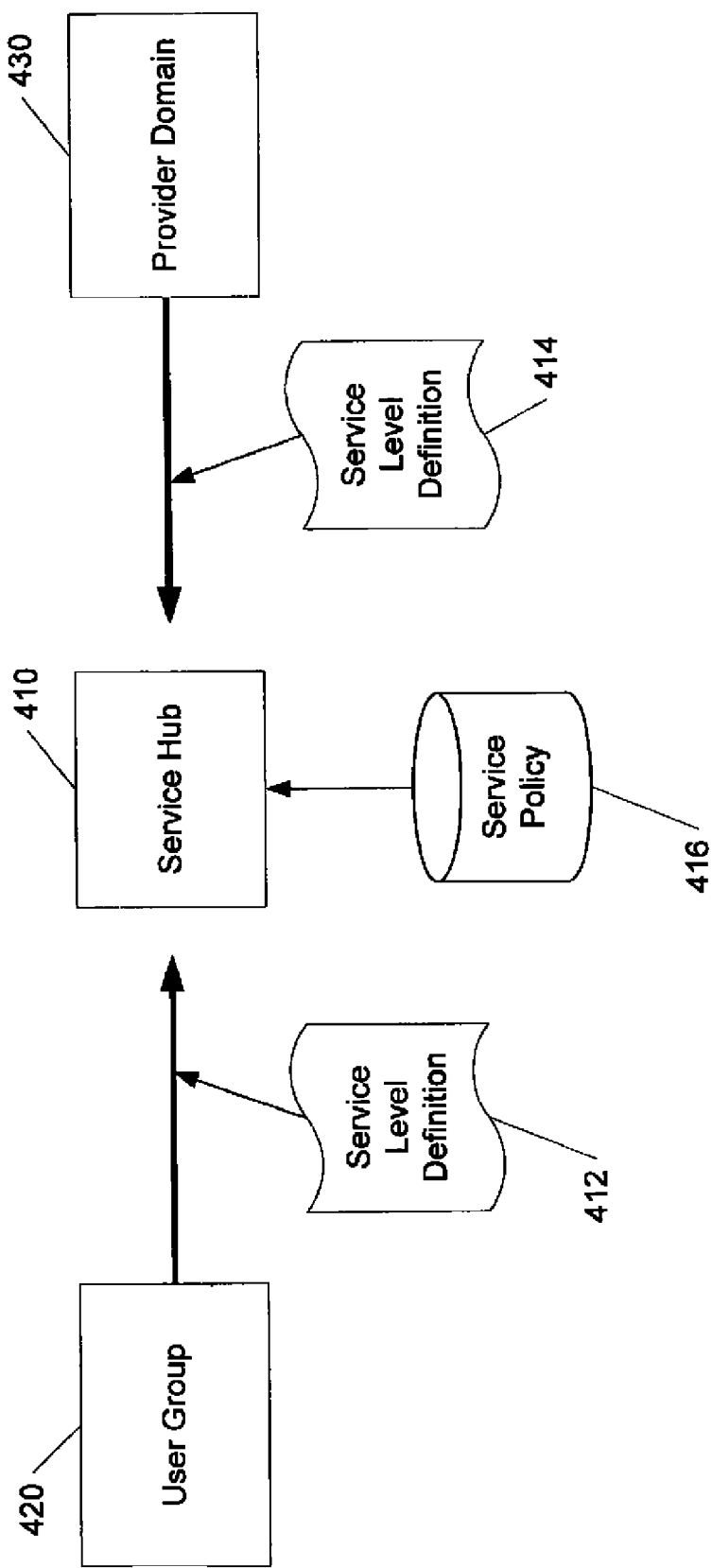
FIG. 4 is a schematic diagram illustrating exemplary soft contracting relationships in a web services environment using service level definitions according to further embodiments of the present invention.

FIG. 4 illustrates exemplary contractual relationships that a service hub 410 may maintain with service providers and service requesters, in terms of service lavel definitions 412, 414 that are mapped to one another according to a service policy 416. The service definitions 412, 414 may be viewed as providing adjustable service contracts to a user group 420 and provider contracts to provide a category of services by a service domain 430. Neither side is bound by the inflexibility of fixed contracts, and both can enter the relationships with the service hub 410 with some fixed services and some classes of services.

For the environment shown in FIG. 4, an exemplary service level definition for the user side might be (note that XML delimiters "<" and ">" have been removed such that the text displayed below is not executable):

```
service_levels-section type="USER"
    servicelevel name="GOLD" feebase="feebase1"
        qos="BEST"
    category name="baseshopping"
        port name="default port" qos="BETTER"
```

```
        operation name="getAddress"
        operation name="purchaseOrder"
        operation name="*"
        /port
    category name="finance"
        port name="*" /
    category ........
        ...........
    /servicelevel
/service_levels-section
```

An exemplary service level definition for the provide side might be:

```
service_levels-section type="SUPPLIER"
    servicelevel name="PREMIER" feebase="feebaseA"
        qos="Catagory5"
    category name="baseshopping"
        port name="default port"/
        operation name="getQuoteMultiple"/
        operation name="getQuoteDescriptive"/
        operation name="getAddress"/
        operation name="purchaseOrder"/
        /port
    category name="finance"
        port name="*" /
    category ........
        ...........
    /servicelevel
    ....................
/service_levels-section
```

The service policy 416 may be viewed as mapping these different definitions upon one another to complete the contracts. On the provider side, services can be added on demand, with the business relationship in terms of payment, quality of service (QoS), service categories, etc., already agreed upon. On the user side, a service requester can subscribe to a service level that guarantees the types of services, fee scheme, and quality levels. The service hub 410 can prepare the specific service ports responsive to the user service level description at actual runtime based on, for example, the polling and discovery process described above. Reliability can be guaranteed by virtue of the predetermined categorical service agreements.

When inserting a level between sub domains and main domain, or aggregating the main domain to a new super main domain, existing contract relationships can remain intact for all services downward in the affected domains. The new domains can assume the contracts of the affected domains, enter new contracts with the main domain, or substitute contracts offered by the predecessors. Individual services can remain intact and can be insensitive sensitive to domain ownership changes. The main domain can automatically adjust its internal topology pointers to find the services to use at runtime as it goes by coordinating discovery cycles at the various levels. Therefore, embodiments of the present invention can set up a distributed business method that provides a continuous operational service environment that is non-disruptive and self configuring to a domain topology that expands and shrinks naturally. Services can be added and consumed immediately without additional contracting processing. Main and sub domains can control through policies filtering what services to include in the ultimate domain. Services can be added on demand based on market requirements without recompile or rebuild needed from the requesters for using these services.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of providing web services, the method comprising:
    creating an electronic record of a contract for a service provider to provide web services meeting a web service category definition at a web services hub of a web services domain;
    identifying a plurality of ports operative to provide web services meeting the web service category definition at the web services hub;
    providing a web service to a service requestor from the web services domain responsive to the electronic record of the contract and identification of the ports;
    polling at least one web services node subordinate to the web services hub to identify at least one service provided by the web services node, wherein polling the at least one web services node comprises polling a plurality of levels of web services nodes using staggered polling intervals for adjacent levels of the web services domain; and
    updating a description of a service category responsive to the polling.

* * * * *